United States Patent [19]

Schlichting, Jr.

[11] 4,302,546
[45] Nov. 24, 1981

[54] ORGANIC WASTE CONVERTER

[76] Inventor: Harold E. Schlichting, Jr., 151 S. Ridge St., Port Sanilac, Mich. 48469

[21] Appl. No.: 907,582

[22] Filed: May 19, 1978

[51] Int. Cl.³ .................. C12M 1/02; C12M 1/06; B01J 19/18; C05F 11/00
[52] U.S. Cl. .................................. 435/315; 71/9; 422/184; 422/198; 422/209; 435/316
[58] Field of Search ............ 23/259.1; 71/9; 210/15; 422/184, 209, 225, 198; 435/312, 313, 314, 315, 316

[56] References Cited

U.S. PATENT DOCUMENTS

| | | | |
|---|---|---|---|
| 2,880,074 | 3/1956 | Carmichael | 23/259.1 |
| 3,149,922 | 9/1964 | Lavallee | 422/209 |
| 3,175,887 | 3/1965 | Van Den Berg | 71/9 |
| 3,236,743 | 2/1966 | Pierson | 23/259.1 X |
| 3,248,175 | 4/1966 | Emmet | 23/259.1 |
| 3,577,229 | 5/1971 | Bruck | 71/9 |
| 3,676,074 | 7/1972 | Shibayama et al. | 71/9 X |
| 3,895,916 | 7/1975 | Rosner | 23/259.1 |
| 4,060,390 | 11/1977 | Shimuzu et al. | 71/9 X |

FOREIGN PATENT DOCUMENTS 2426285 12/1975 Fed. Rep. of Germany ............ 71/9
2451284 5/1976 Fed. Rep. of Germany ............ 71/9

*Primary Examiner*—Frank W. Lutter
*Assistant Examiner*—Roger F. Phillips

[57] ABSTRACT

An airtight chamber insulated with an anti-corrosive coating allows the control of the heat and moisture content of organic wastes for rapid aerobic decomposition by naturally occurring thermal bacteria. Air is drawn into the chamber, over and through the organic waste and carbonaceous filler materials and is exhausted through an air scrubber. Agitation of the waste mixture is by means of two or more anti-corrosive coated stirrers on a rotating shaft; the rotation rate being two revolutions or less per minute to accelerate the biological decomposition process and 35 or more revolutions per minute to fluff and dry the material after the completion of the biological process. During the drying process the air direction is reversed by means of a blower and a controlled heating element to speed drying. Utilization of the blower and heating element also helps to initiate the biological decomposition activity in cold temperatures.

2 Claims, 4 Drawing Figures

ORGANIC WASTE CONVERTER

BACKGROUND OF THE INVENTION

1. Field of Invention

This invention, as described in Disclosure Document No. 53116 filed Oct. 6, 1976, relates to a relatively inexpensive apparatus in which the biological conditions are controlled and monitored for converting organic wastes into a soil conditioner and animal feed supplement economically within a 48-72 hour period.

2. State of the Art

Many patents have been granted for various machines to biologically convert organic wastes into stable soil conditioners useful in agriculture and horticulture. Organic wastes have been enclosed under plastic film and placed in rotating drums, tumblers, and mixers of various types to allow aerobic bacteria to decompose the organic wastes.

Examples of such machines are covered under U.S. Pat. Nos. 3,041,148; 3,054,663; 3,245,759; 3,676,074; 279,094 and 376,763. These machines are either too complicated and costly or oversimplified to the degree that the process is too time consuming to be the most economical and suitable for use by farmers throughout the world.

OBJECTIVES OF THIS INVENTION

An objective of this invention is to provide a sanitary non-polluting method of handling organic wastes, especially agricultural wastes, without additives utilizing an organic waste converter, inexpensive in construction and simple in operation, which yields a high quality organic soil conditioner and animal feed supplement as well as sources of heat, carbon dioxide and ammonia within 48-72 hours.

Another objective and improvement in the art is to allow the decomposition and drying processes to be completed in the same chamber. This improvement is not only more economical but prevents contamination by microorganism accumulation such as the plant pathogen, Alternaria, as occurs when the decomposed wastes are transferred to a second chamber for drying.

Another objective is to utilize the heat given off for approximately 40 hours during the decomposition process as an energy source to heat water and buildings.

SUMMARY OF THIS INVENTION

The waste converter of this invention is an airtight chamber essentially as herein described and illustrated with an insulative interior coating to maintain the required moisture content, air flow and agitation rate and to retain the heat produced by thermal bacteria during the decomposition process. During the decomposition process the air flow is controlled to regulate the microbial activity and is exhausted through an air scrubber to recover the gases such as carbon dioxide and ammonia produced. During the drying process the air direction is reversed and forced by a blower through the chamber to stabilize and dry the finished product.

The waste is agitated by two or more anti-corrosive coated stirrers on a shaft rotating at two revolutions or less per minute during the decomposition process and 35 revolutions or more per minute during the drying process. The stabilized organic waste is decomposed, dried and ready for use within 48-72 hours.

BRIEF DESCRIPTION OF THE DRAWINGS

For additional clarification of this invention the following description and appended drawings are offered here for illustration only and not in limitation of this invention whose scope is set forth in the appended claims:

In the drawings.

DESCRIPTION OF THE PREFERRED EMBODIMENTS

Figure 1:
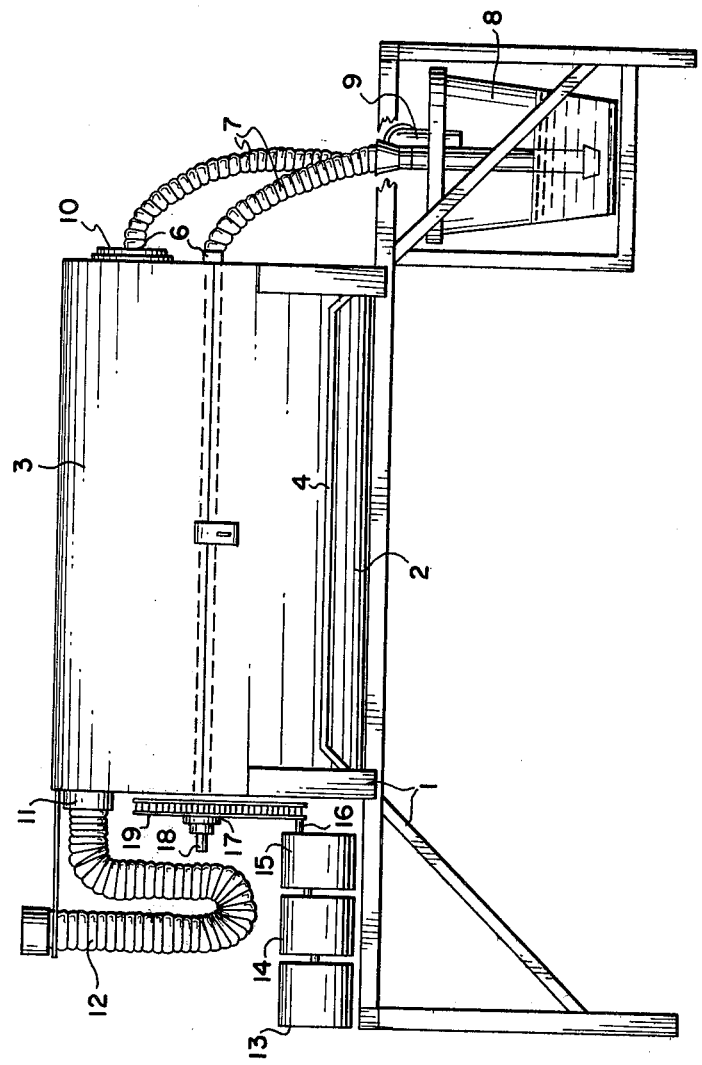
FIG. 1 is a pictorial frontal view of the waste converter.

The waste converter apparatus illustrated in FIGS. 1-4 includes a cylindrical chamber 2 which is horizontally disposed and mounted on a supporting frame 1. The chamber may be fabricated from any strong material which can be corrosion proofed and insulated with thermal plastic, stainless steel, teflon or similar coatings. The support frame 1 also positions a standard drive system composed of an electric motor 13, two speed transmission 14, and gear reducer 15; the drive systems being connected by gears 16, 17 belts or chain drive 19, to the shaft 18 which turns the stirrers 20 and stirrer support rods 21 at variable speeds from 0.5 to 35 or more revolutions per minute.

The chamber 2 is filled through the loading door 3 at the top and is emptied through the sliding door 4 at the bottom. A carbonaceous filler such as straw, sawdust or shredded paper, and animal manures in a 40-60% or 50-50% ratio are placed in the chamber filling to approximately 50% capacity.

External air is drawn through the baffled port 5 into the chamber 2 at rates of 2.5 to 5 ft$^3$ per ton per minute while the semi-solid filler manure mixture at 40-60% moistures is being stirred at 2 or less revolutions per minute. Following approximately 6 hours of aeration and stirring, the mixture heats up because of the rapid growth of the naturally occurring thermophillic bacteria. The air from the chamber is removed through an air scrubber system (moist air exhaust port 6, moist air exhaust tube 7, and the air scrubber 8) which recovers such gases as ammonia and carbon dioxide resulting from the biological decomposition process, and is exhausted through the clean air exhaust port 9; thereby eliminating atmospheric pollution which otherwise would occur.

After approximately 46 hours of operation, the temperature of the mixture drops from a high of about 80° C. to 70° C. at which time the stirrers are turned to 35 or more revolutions per minute and air is gently blown (approximately 1 ft$^3$/min) over the mixture by a blower 10 and is exhausted through the dry air exhaust port 11 and the dry air exhaust tube 12 to the outside of the chamber. The small particulate matter in the exhausted air settles in the lower portion of the exhaust tube 12 and can be removed and returned to the finished product.

Under humid environmental conditions the heating element within the blower 10 is utilized to speed the drying process. When the external air temperature is below 18° C., the blower and heating element are used to warm the filler-manure mixture within the chamber to initiate the biological decomposition process. With less than six hours of fluffing and drying at 35 or more revolutions per minute with air gently and continuously passing through the chamber, the product is sufficiently dried (10 to 15% moisture content) to be bagged, stored in bins, or applied directly to fields and gardens or used as animal feed supplements.

The heat released by the thermophilic bacteria for approximately 40 hours during the aerobic decomposition process can be utilized by placing standard types of heat exchangers within the chamber; the simplest system being copper tubing through which water is circulated.

The value of the organic soil conditioner produced is well documented in the scientific literature;

Davey, C. B. & W. S. Galler. 1971. High Rate Poultry Manure Composting with Sawdust. *Proc. Intl. Symp. Livestock Wastes.* Amer. Soc. Ag. Engineers. pp. 159–162.

Golueke, C. G. 1972. *Composting.* Rodale Press, Emmaus, Pa. 18049 pp. 110.

Golueke, C. G. 1977. *Biological Reclamation of Solid Wastes.* Rodale Press. Emmaus, Pa. 18049 pp. 249.

Research concerning the utilization of this product as a livestock and poultry feed supplement is now under investigation. Preliminary results look promising.

The improvement in the art desired to be protected by a letters patent is the totality and interrelationships of the appended claims.

I claim:

1. A combined composting and drying apparatus with very low energy requirements for biologically converting semi-solid organic wastes especially agricultural wastes, without additives such as bacteria or microorganism cultures or synthetic chemicals, into a high quality soil conditioner and animal feed supplement within 48–72 hours and providing sources of heat, carbon dioxide and ammonia, comprising:

a. A heat-insulated, essentially airtight single chamber with a corrosion proof stirring system for agitating said organic wastes during the step of digesting and the resulting compost during the step of drying thereof;

b. Means to rotate said stirring system at two or less rotations per minute during said digesting step and at 35 or more rotations per minute during said drying step;

c. Means to draw air through said chamber during said digesting step and to scrub the exhausted air, thus recovering the resulting gases such as ammonia and carbon dioxide;

d. Means to reverse air flow within said chamber and to provide heat therein comprising a blower with a heating element operative to provide heated air to fluff and dry the finished product during said drying step; and e. a heat exchanger located within the chamber for absorbing heat produced during said digesting step.

2. The apparatus of claim 1 wherein said blower and heating elements are operable at the beginning of said digesting step to initiate the microbial digestion process when external air temperature are below 18° C.

* * * * *

UNITED STATES PATENT AND TRADEMARK OFFICE
CERTIFICATE OF CORRECTION

PATENT NO. : 4,302,546

DATED : November 24, 1981

INVENTOR(S) : Harold E. Schlichting, Jr.

Figure 2:
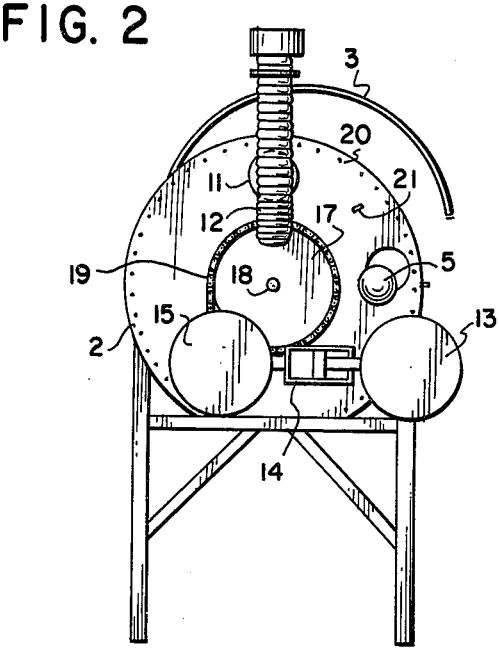
FIG. 2 is a left end view of FIG. 1.
Figure 3:
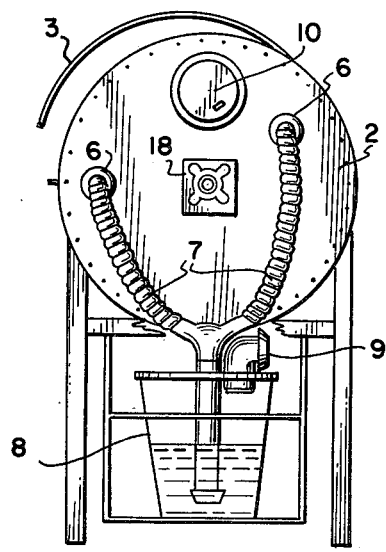
FIG. 3 is a right end view of FIG. 1.
Figure 4:
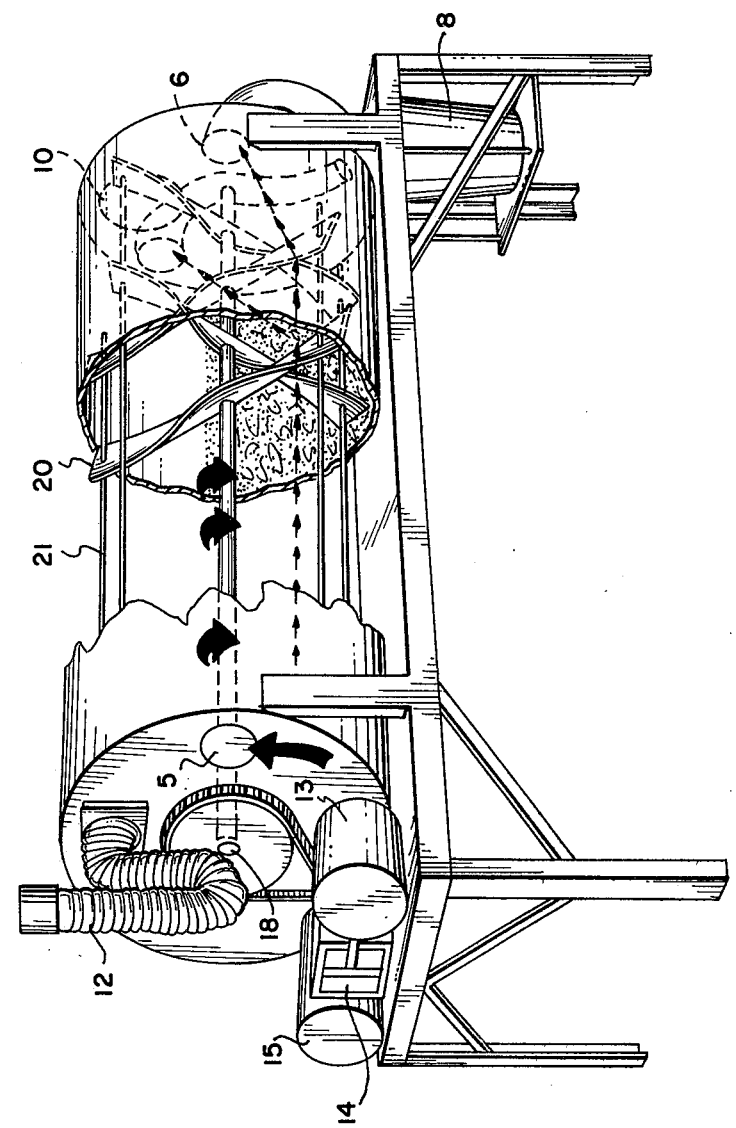
FIG. 4 is a cut away view of FIG. 1 showing a representative portion of the internal structure.
Figure 2:
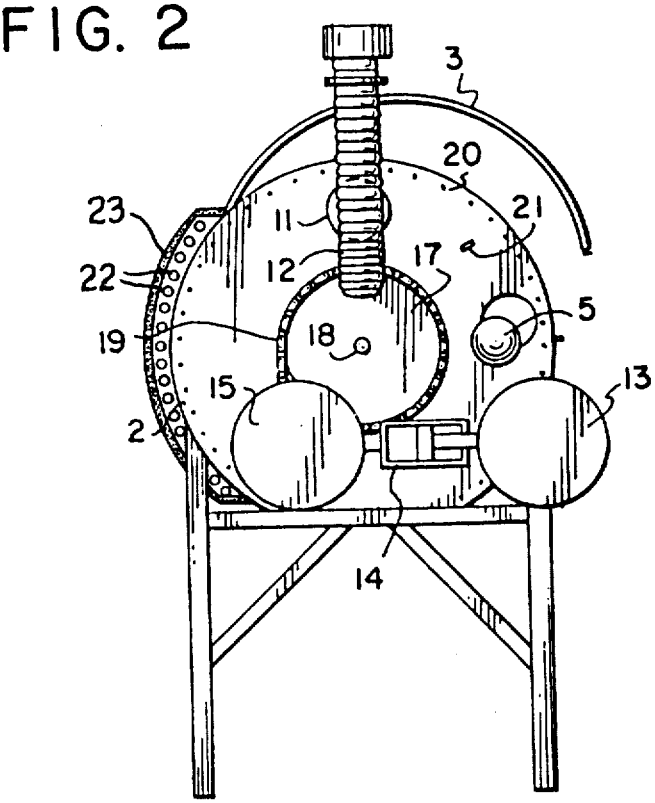
Figure 3:
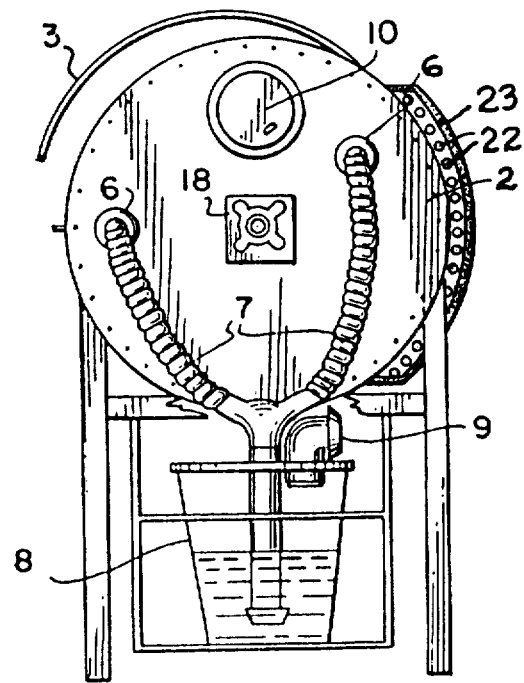
Figure 4:
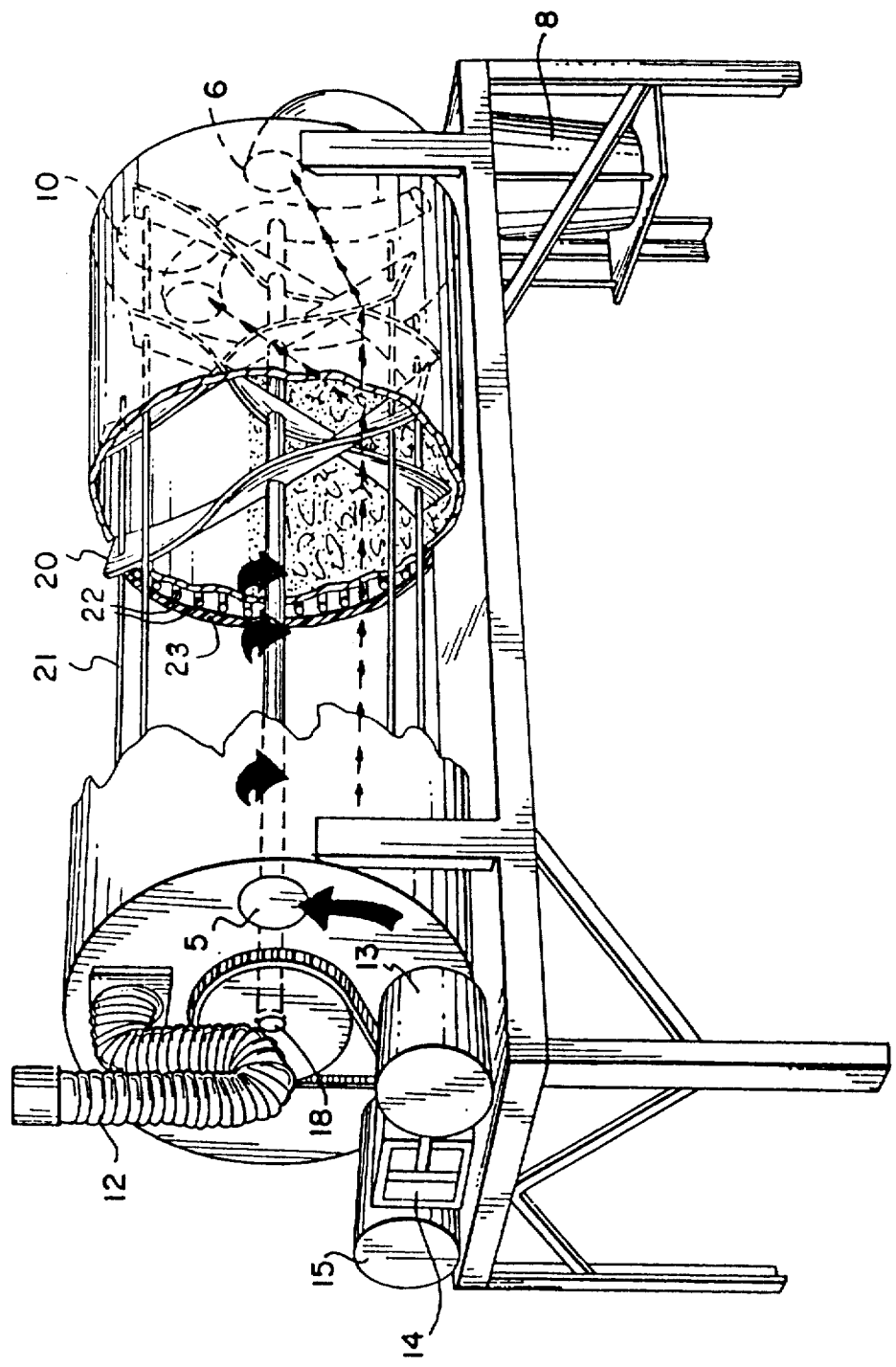

It is certified that error appears in the above—identified patent and that said Letters Patent is hereby corrected as shown below:

Figs. 2,3 and 4:

Please show heat exchanger (22) and Insulation (23) on each of Figures 2,3 and 4;

Col. 2, line 23:

Insert --23-- after "coatings";

UNITED STATES PATENT AND TRADEMARK OFFICE
CERTIFICATE OF CORRECTION

PATENT NO.   :  4,302,546

DATED        :  November 24, 1981

INVENTOR(S)  :  Harold E. Schlichting, Jr.

It is certified that error appears in the above-identified patent and that said Letters Patent is hereby corrected as shown below:

Col. 3, line 10:

Insert --22-- after "exchangers".

The sheets of drawings consisting of Figs. 2, 3 and 4 should appear as per attached sheets.

Signed and Sealed this

Third Day of May 1983

[SEAL]

Attest:

Attesting Officer

GERALD J. MOSSINGHOFF

Commissioner of Patents and Trademarks